(12) United States Patent
Sharpe-Geisler et al.

(10) Patent No.: US 7,787,326 B1
(45) Date of Patent: Aug. 31, 2010

(54) PROGRAMMABLE LOGIC DEVICE WITH A MULTI-DATA RATE SDRAM INTERFACE

(75) Inventors: Brad Sharpe-Geisler, San Jose, CA (US); Om P. Agrawal, Los Altos, CA (US); Kiet Truong, San Jose, CA (US); Giap Tran, San Jose, CA (US); Bai Nguyen, Union City, CA (US)

(73) Assignee: Lattice Semiconductor Corporation, Hillsboro, OR (US)

( * ) Notice: Subject to any disclaimer, the term of this patent is extended or adjusted under 35 U.S.C. 154(b) by 477 days.

(21) Appl. No.: 12/019,526

(22) Filed: Jan. 24, 2008

Related U.S. Application Data

(62) Division of application No. 11/165,853, filed on Jun. 24, 2005, now Pat. No. 7,342,838.

(51) Int. Cl.
*G11C 8/18* (2006.01)

(52) U.S. Cl. ............ 365/233.12; 326/39; 365/193; 365/194; 365/233.13

(58) Field of Classification Search ............ 326/39; 365/193, 194, 233.11, 233.12, 233.13
See application file for complete search history.

(56) References Cited

U.S. PATENT DOCUMENTS

| | | | | |
|---|---|---|---|---|
| 5,396,126 A | * | 3/1995 | Britton et al. | 326/41 |
| 6,472,904 B2 | * | 10/2002 | Andrews et al. | 326/38 |
| 6,487,648 B1 | * | 11/2002 | Hassoun | 711/167 |
| 6,507,888 B2 | * | 1/2003 | Wu et al. | 711/105 |
| 6,775,190 B2 | * | 8/2004 | Setogawa | 365/193 |
| 6,862,248 B2 | * | 3/2005 | Shin | 365/233.13 |
| 6,940,768 B2 | | 9/2005 | Dahlberg | |
| 6,952,115 B1 | * | 10/2005 | Andrews et al. | 326/46 |
| 7,126,399 B1 | | 10/2006 | Lee | |
| 7,177,230 B1 | * | 2/2007 | Huang | 365/233.1 |
| 7,187,598 B1 | | 3/2007 | Daugherty | |
| 7,231,536 B1 | | 6/2007 | Chong | |
| 7,234,069 B1 | | 6/2007 | Johnson | |

OTHER PUBLICATIONS

Weaver et al., "The SFRA: A Corner-Turn FPGA Architecture," FPGA '04. Feb. 2004. pp. 3-12.*
Max II Device Handbook, MII51002-1.2, Alteration Corporation, Dec. 2004. 5 pages.*
Xilinx, Spartan-3 FPGA Family: Complete Data Sheet, DS099. Jan 17, 2005. 5 pages.*
Cyclone Device Handbook, vol. 1, Altera Corporation, Feb. 2005. 6 pages.*
Xilinx, Virtex-II Platform FPGAs: Complete Data Sheet, DS031, v3.4, Mar. 1, 2005. 5 pages.*
JEDEC Standard JESD79 "Double Data Rate (DDR) SDRAM Specification." Jun. 2000. 77 pages.*

* cited by examiner

*Primary Examiner*—Dang T Nguyen
*Assistant Examiner*—Alexander Sofocleous

(57) ABSTRACT

Within a programmable logic device, a multi-data rate SDRAM interface such as a DDR SDRAM interface includes in one embodiment a DQS clock tree, a slave delay circuit, and a delay-locked loop (DLL). The slave delay circuit is adapted to shift the phase of the DQS signal relative to the phase of data to provide a phase-shifted DQS signal to the DQS clock tree, and the DLL is adapted to control the slave delay circuit. The DLL includes a delay line comprising a plurality of instantiations of the slave delay circuit and a plurality of facsimiles of the DQS clock tree.

13 Claims, 6 Drawing Sheets

US 7,787,326 B1

PROGRAMMABLE LOGIC DEVICE WITH A MULTI-DATA RATE SDRAM INTERFACE

RELATED APPLICATION DATA

This application is a divisional of U.S. patent application Ser. No. 11/165,853, filed Jun. 24, 2005, now U.S. Pat. No. 7,342,838, which is hereby incorporated by reference in its entirety.

TECHNICAL FIELD

The present invention relates generally to programmable logic devices (PLDs), and more particularly to a programmable logic device having a multi-data rate SDRAM interface.

BACKGROUND

The flexibility of programmable logic devices such as field programmable gate arrays (FPGAs) makes these devices attractive options for memory controller applications. However, should a memory controller need to interface with a multi-data rate synchronous dynamic random access memory such as DDR SDRAM, the use of FPGAs as memory controllers becomes challenging—the required I/O speeds and associated clocking becomes difficult to implement, particularly in view of the non-deterministic routing delays inherent in such devices and their often limited input/output (I/O) speeds. These challenges may be better understood with respect to the nature of a multi-data rate interface such as a DDR SDRAM interface.

Synchronous DRAM (SDRAM) differs from conventional DRAM in that both the memory clock and the system clock are synchronized to increase operating speeds. DDR SDRAM is even faster than SDRAM because data transfers occur on both edges of the memory clock, making DDR SDRAM a popular memory option. To accomplish their high-speed data transfers, DDR SDRAM interfaces rely on the use of a data strobe signal called DQS. An internal system clock from the FPGA is provided to the DDR SDRAM so that the DDR SDRAM may generate DQS and a data signal DQ that are edge aligned. Although DQS has the same frequency as the internal clock, their phase relationship is unpredictable. Regardless of this phase relationship, to correctly read the data at a corresponding DDR SDRAM interface input register, DQS must be phase-shifted by 90 degrees (delayed) with respect to DQ. A DDR SDRAM interface thus requires DQS-to-DQ phase alignment circuitry to accomplish this phase shift. Conventional FPGA DDR SDRAM interfaces use a fixed phase delay circuit to delay DQS (open loop operation). However, temperature changes, voltage changes, and semiconductor process variations will affect the generated delay such that the phase shift varies from the desired 90 degrees. Accordingly, there is a need in the art for a DDR SDRAM interface that adaptively controls the phase shift for the DQS signal.

In addition, data read by an FPGA from a DDR SDRAM must be multiplexed from its double data rate clock domain to a single data rate clock domain within the FPGA. As discussed previously, the single data rate clock domain is responsive to an internal FPGA system clock that has an unknown phase relationship to the DQS and DQ signals. Thus there is the problem of choosing the proper internal system clock edge to transfer data from the DQS domain to the internal clock domain. Conventional FPGA DDR SDRAM interfaces leave this selection problem to the user. Accordingly, there is a need in the art for DDR SDRAM interfaces that automatically select the proper internal clock edge for a DQS-to-system clock domain transfer.

SUMMARY

As described above, multi-data rate SDRAM such as DDR SDRAM is often coupled to a programmable logic device (PLD) configured as a memory controller. The DDR SDRAM provides data to the PLD on the rising and falling edges of a DQS signal.

In one embodiment of the invention, a multi-data rate SDRAM interface within the PLD comprises a DQS clock tree, a slave delay circuit, and a master delay circuit. The slave delay circuit is adapted to shift the phase of the DQS signal relative to the phase of data to provide a phase-shifted DQS signal to the DQS clock tree, the slave delay circuit responsive to a control signal in providing the amount of phase shift. The master delay circuit is adapted to generate the control signal for the slave delay circuit. In setting the value of the control signal, the master delay circuit compares the internal PLD clock with a delayed version of the internal clock. To provide the delayed version of the internal clock, the master delay circuit includes a delay line comprising a plurality of instantiations of the slave delay circuit and a plurality of facsimiles of the DQS clock tree.

In another embodiment of the invention, the multi-data rate SDRAM interface comprises a DQS clock tree, a slave delay circuit, and a delay-locked loop (DLL). The slave delay circuit is adapted to shift the phase of the DQS signal relative to the phase of data to provide a phase-shifted DQS signal to the DQS clock tree, and The DLL is adapted to control the slave delay circuit. The DLL includes a delay line comprising a plurality of instantiations of the slave delay circuit and a plurality of facsimiles of the DQS clock tree.

BRIEF DESCRIPTION OF THE DRAWINGS

Use of the same reference symbols in different figures indicates similar or identical items.

DETAILED DESCRIPTION

Reference will now be made in detail to one or more embodiments of the invention. While the invention will be described with respect to these embodiments, it should be understood that the invention is not limited to any particular embodiment. On the contrary, the invention includes alternatives, modifications, and equivalents as may come within the spirit and scope of the appended claims. Furthermore, in the following description, numerous specific details are set forth to provide a thorough understanding of the invention. The invention may be practiced without some or all of these specific details. In other instances, well-known structures and principles of operation have not been described in detail to avoid obscuring the invention.

Figure 1:
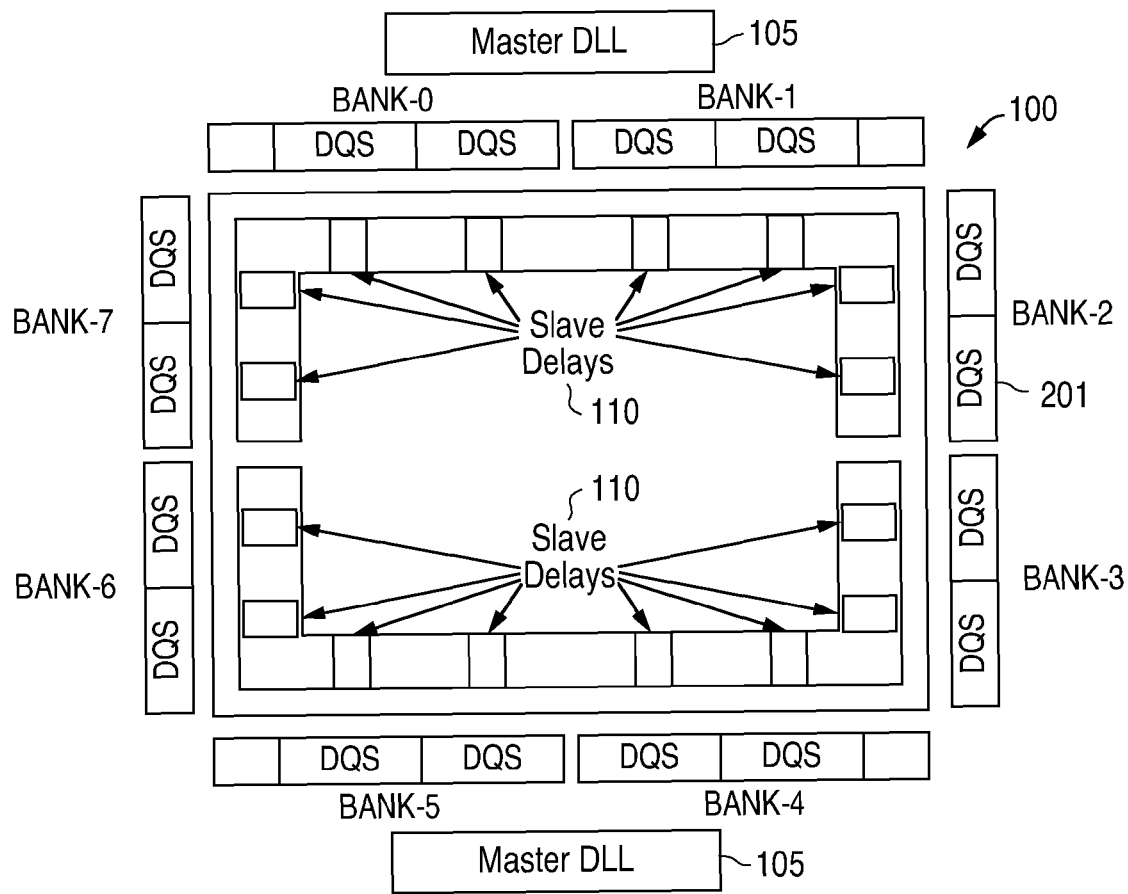
FIG. 1 is a block diagram of a programmable logic device having a DDR SDRAM interface in accordance with an embodiment of the invention.
Figure 2:
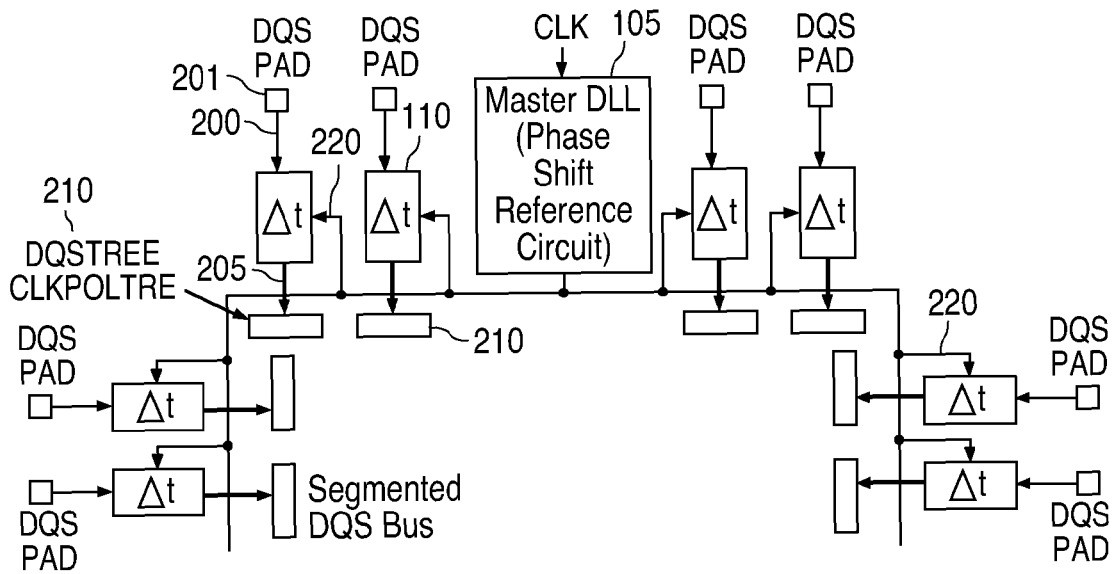
FIG. 2 is a block diagram illustrating the relationship between a master delay-locked loop (DLL) and slave delay circuits in the interface of FIG. 1.

FIG. 1 illustrates an exemplary programmable logic device 100 that includes one or more master delay-locked loops (DLLs) 105 for compensation of slave delay circuits 110 that phase shift DQS signals. As known in the DDR SDRAM arts, an external DDR SDRAM (shown and discussed further with respect to FIG. 4) generates a DQS signal for each byte of DQ data signals transferred in parallel from the external DDR SDRAM. Programmable logic device 100 includes a total of sixteen slave delay circuits 110 such that a total of sixteen bytes of data may be written to or read from the external memory simultaneously. As shown in FIG. 2, each master delay locked loop (DLL) 105 may control eight slave delay circuits 110. It will be appreciated, however, that the number of slave delay circuits 110 controlled by an individual master DLL 105 is not limited to eight but instead may be varied to suit individual design needs. Each slave delay circuit 110 receives a DQS signal 200 from the external memory through a pad 201. A phase-shifted DQS signal 205 from each slave delay circuit 110 is then provided to a DQS clock tree 210 so that internal registers (not illustrated) coupled to the DQS clock tree may be properly clocked to receive DDR SDRAM data. As discussed previously, effects such as temperature changes, voltage changes, and semiconductor process variations will affect the amount of delay introduced into each phase-shifted DQS signal 205 from the corresponding slave delay circuit as well as the delay through each DQS clock tree 210. Master DLL 105 corrects for these variations by controlling its slave delay circuits with a slave delay circuit control signal 220. Thus, the amount of phase shift (represented by Δt) in each phase-shifted DQS signal 205 depends upon the value of control signal 220.

Figure 3:
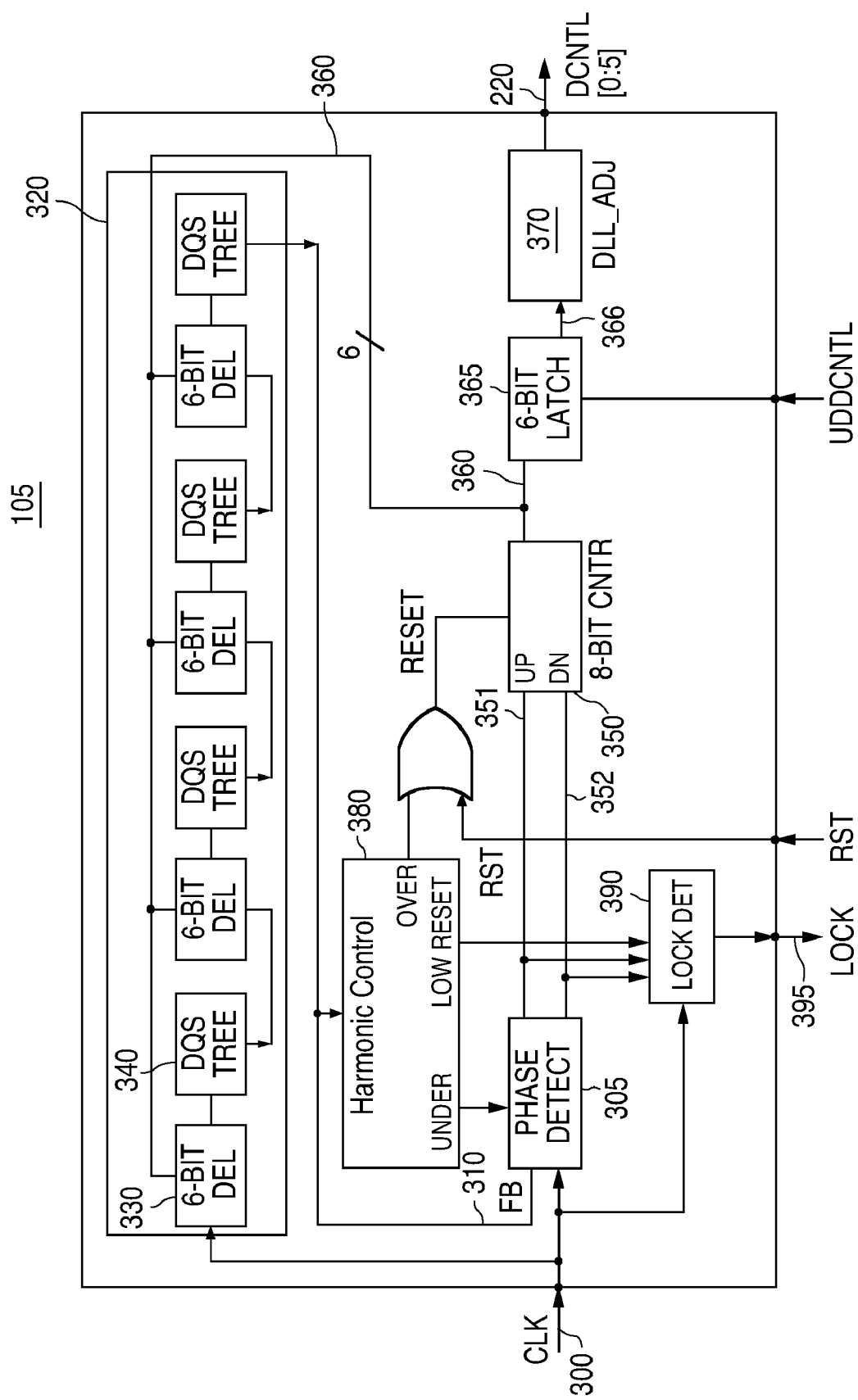
FIG. 3 is a block diagram for an exemplary embodiment of the master DLL of FIG. 2.

A block diagram for an exemplary embodiment of master DLL 105 is illustrated in FIG. 3. An internal PLD system clock CLK 300 is compared at a phase detector 305 with a feedback signal FB 310 provided by a delay line 320 that also receives internal clock signal CLK 300. Delay line 320 includes four instantiations of the slave delay circuits. For example, if each slave delay circuit 110 is a six-bit (sixty four possible delay settings) delay circuit, delay line 320 includes four six-bit delay circuits 330. Each delay circuit 330 is followed by a facsimile 340 of DQS clock tree 210. An eight-bit counter 350 receives an up command 351 or a down command 352 from phase detector 305 in response to the comparison of feedback signal FB 310 and internal clock CLK 300. To curtail over control and jitter, only the six most significant bits are used from eight-bit counter 350 to form a six-bit control signal 360 for controlling the delay circuits 330. Thus, when master DLL 105 is in lock such that feedback signal FB 310 is a 360 degree delayed version of internal clock CLK 300, a version of six-bit control signal 360 could be used to control slave delay circuits 110 such that 90 degrees of phase shift is ensured at the registers coupled to the DQS clock trees 210. For example, six-bit control signal 360 may be processed through a six-bit latch 365 to prevent updating of delay circuits 110 during a read operation. An output 366 from latch 365 may then be processed in a variable delay circuit 370 to provide six-bit slave delay circuit control signal 220. The variable delay provided by delay circuit 370 may be used should there be delay disparities between clock tree facsimiles 340 and the actual DQS clock trees 210. The output from variable delay circuit 370 is slave delay circuit control signal 220 discussed with respect to FIG. 2. A harmonic control circuit 380 provides coarse control to ensure a 360-degree delay between feedback signal FB 310 and internal clock CLK 300. When master DLL 105 is phase locked, a lock detector circuit 390 asserts a lock signal 395.

Consider the advantages of the precision compensation provided by master DLL 105. Any temperature, voltage, or process variations that affect the delay through a slave delay circuit 110 and its associated DQS clock tree 210 are accounted for by the corresponding delay through a delay circuit 330 and DQS clock tree facsimile 340 pair. Thus, a user of programmable logic device 100 need not limit data transfer rates from the external DDR SDRAM (such as limiting the data transfer rate to be between 100 MHz and 133 MHz) as would be the case if open loop delay circuits were used to provide phase-shifted DQS signals 205. Programmable logic device 100 may thus support a relatively high data transfer rate such as 200 MHz or greater. It will be appreciated that rather than use a 360 degree delay line such as delay line 320, integer multiples of 360 degrees may be used, at the cost of greater complexity and manufacturing expenses.

Figure 4:
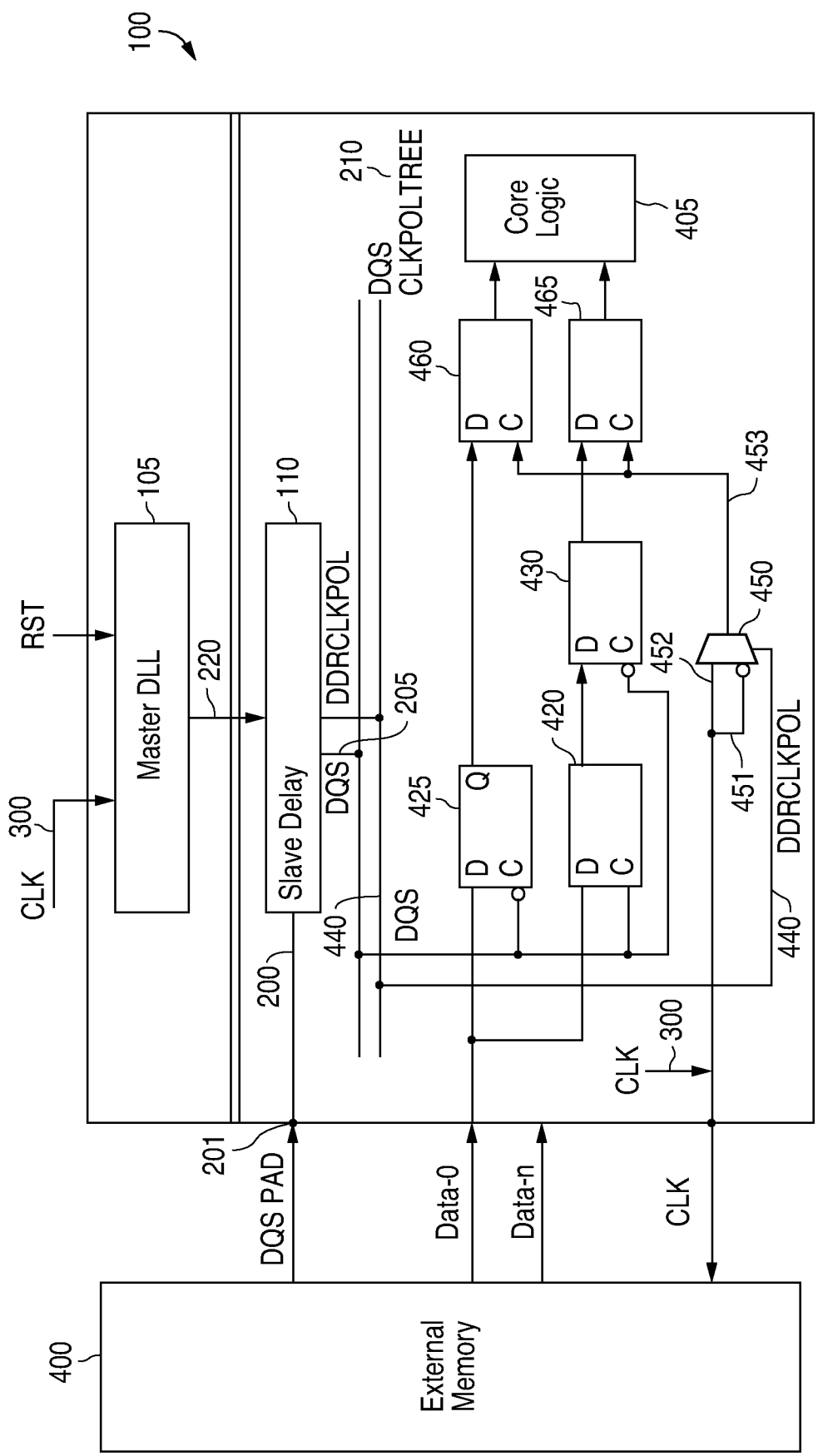
FIG. 4 is a block diagram illustrating exemplary embodiments of components for transferring DDR data from the DQS domain to the internal clock domain for the interface of FIG. 1.

An exemplary implementation of an external DDR SDRAM 400, master DLL 105, and a corresponding slave delay circuit 110 may be better understood with reference to FIG. 4. For each byte of data that may be read from DDR SDRAM 400, this memory provides an associated DQS strobe signal on DQS pad 201 as known in the DDR SDRAM arts. After processing through, for example, an input buffer, the DQS strobe signal on pad 201 become internal DQS signal 200 for programmable logic device 100. Master DLL 105 processes internal clock 300 as discussed with respect to FIG. 3 so that master DLL 105 may control slave delay circuit 110 with control signal 220 so as to phase shift DQS 200 by ninety degrees to form phase-shifted DQS 205. Although phase-shifted DQS 205 is conventionally used for a byte of DDR data, for generality a positive integer n of data bits data 0 through data n are shown being provided by DDR SDRAM 400 to programmable logic device 100. These data signals will then be strobed according to phase-shifted DQS signal 205.

Because a core 405 of programmable logic device 100 operates according to a single edge of internal clock CLK 300, the data bits from DDR SDRAM 400 need to be converted from a double clock edge (DDR) domain to the single clock edge domain for programmable logic device 100. Clock domain transfer circuitry will thus need to process all data bits data 0 through data n. For illustration clarity, this clock domain transfer circuitry is shown only for bit data 0, which is received in parallel with all the remaining bits up to and including bit data n. Because the first data bit following a DDR SDRAM preamble will coincide with a rising edge of DQS 200, a positive-edge-triggered register 420 captures this bit responsive to the positive edges of phase-shifted DQS 205. A negative-edge-triggered register 425 captures the subsequent bit responsive to negative edge transitions of phase-shifted DQS 205. These captured bits may be aligned because a negative-edge-triggered register 430 responsive to negative edge transitions of DQS 205 receives the bit captured in register 420. The bits stored in registers 425 and 430 are thus ready to be transferred to the internal clock domain. But as discussed previously, the phase relationship between internal clock CLK 300 and DQS 200 (and hence phase-shifted DQS 205) will be unknown during the design of programmable logic device 100. Thus, a decision should be made as to which edge of the internal clock CLK 300 would be best to clock the aligned (de-multiplexed) data from registers 425 and 430 so as to maximize setup and hold time and minimize glitches and other errors. To perform this decision, clock edge selection logic circuitry (discussed further with respect to FIG. 5) that generates a clock polarity control signal 440 may be integrated with slave delay circuit 110. Polarity control signal 440 controls a clock edge selection multiplexer (mux) 450 that selects between a rising or falling edge of internal clock CLK 300. If the falling edge is appropriate, clock edge selection mux 450 selects for inverting input 451. Conversely, if the rising edge is appropriate, clock edge selection mux 450 selects for non-inverting input 452. Regardless of what input is selected, a positive edge on an output signal 453 is thus presented to registers 460 and 465. Register 460 receives a data input from register 425 whereas register 465 receives a data input from register 430. Thus, register 460 captures the negative edge data whereas register 465 captures positive edge data. The combination of registers 420 through 465 and clock selection mux 450 would be repeated for the other data bits such as data n. In this fashion, all the data is demultiplexed and converted to the system clock domain without glitches and with optimal setup and hold times. In addition, because of the adaptive compensation provided by the master DLL/slave delay circuit combination, phase-shifted DQS signal 205 will have the proper phase shift (ninety degrees) after passing through DQS clock tree 210 so that registers within core logic 405 may be clocked appropriately to receive the system-clock-domain data from registers 460 and 465.

Figure 5:
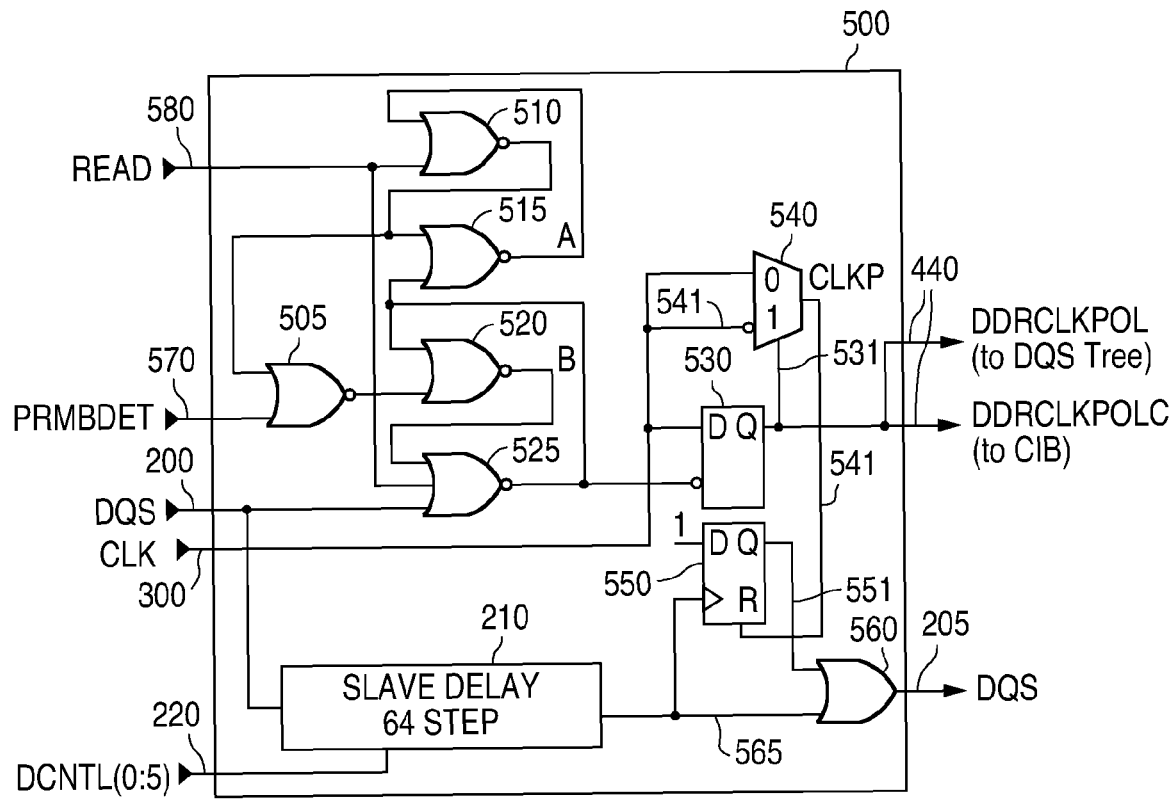
FIG. 5 is a circuit diagram for clock edge selection logic in the interface of FIG. 1.

An embodiment for the clock edge selection logic circuitry will now be described. As seen in FIG. 5, clock edge selection logic circuitry 500 may include cross-coupled NOR gates 505, 510, 515, 520, and 525. An output from NOR gate 525 clocks a negative-edge-triggered register 530. A Q output 531 from register 530 forms clock polarity selection signal 440 discussed with respect to FIG. 4. Q output 531 also controls a clock polarity selection mux 540 that in turn provides an output 541 to a reset input R on a register 550. Register 550 provides a Q output 551 to an OR gate 560 that also receives a phase-shifted DQS signal 565 from slave delay circuit 210. The output from OR gate 560 is phase-shifted DQS 205.

Clock edge selection logic circuitry 500 operates based upon the following principles. Supposing the rising edge of internal clock CLK 300 is used to sample DQS 200 (the undelayed strobe signal) at the start of a read cycle after the preamble. If a logic zero is thus sampled, phase-shifted DQS 205 will not have a rising edge within 90 degrees of a rising edge on internal clock CLK 300. Thus, clock polarity selection signal 440 should control clock polarity mux 450 to select for non-inverted input 452 so that internal clock CLK 300 flows through this mux in a non-inverted form as signal 453 to clock registers 460 and 465. Operation of clock edge selection logic circuitry 500 in such an instance may be referred as case 1 operation. If, however, a logic one is sampled in this sampling operation, phase-shifted DQS 205 may have a rising edge within 90 degrees of a rising edge on CLK 300. Thus, clock polarity selection signal 440 should control clock polarity mux 450 to select for inverted input 451 so that CLK 300 flows through this mux in an inverted form as signal 453 to clock registers 460 and 465. Operation of clock edge selection logic circuitry 500 in such an instance may be referred to as case 2 operation. Note that is may be possible that CLK 300 and DQS 200 happen to be substantially aligned such that either a logic high or zero is possible during the sampling. In such a case, either decision (choosing positive or falling clock edges to clock registers 460 and 465) is a good one since there will be 90 degrees of margin between phase-shifted DQS 205 and CLK 300. It will be appreciated that the architecture shown for clock edge selection logic circuitry 500 is merely exemplary in that many alternative logic circuits could be implemented to perform an equivalent logic function.

Figure 6:
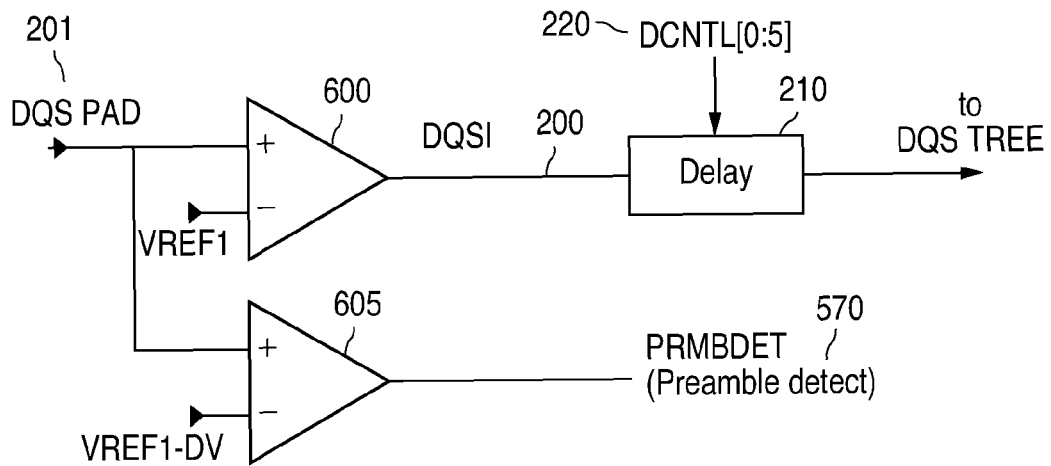
FIG. 6 illustrates a DQS pad and preamble detect paths for the interface of FIG. 1.

NOR gate 505 receives a preamble detect signal (PRMBDET) 570 that may be generated as seen in FIG. 6. An input buffer 600 receives the external DQS signal on pad 201 and compares it to a voltage reference (VREF1) that is half the supply voltage to provide internal DQS signal 200. Prior to a read operation, pad 201 is tri-stated. The external DQS signal on pad 201 will thus be close to VREF1 (half supply) during the tri-state. A resistor divider network (not illustrated) may be used to set a threshold VREF1—DV, where DV is a fraction of VREF1, for an input buffer 605 that also connects to pad 201. For example, DV may be 170 mV. Thus, buffer 605 will properly drive output preamble detect signal PRMBDET 570 low without any glitches when pad 201 exits tri-state and is driven low at the beginning of a read cycle (at the onset of the preamble).

Figure 7:
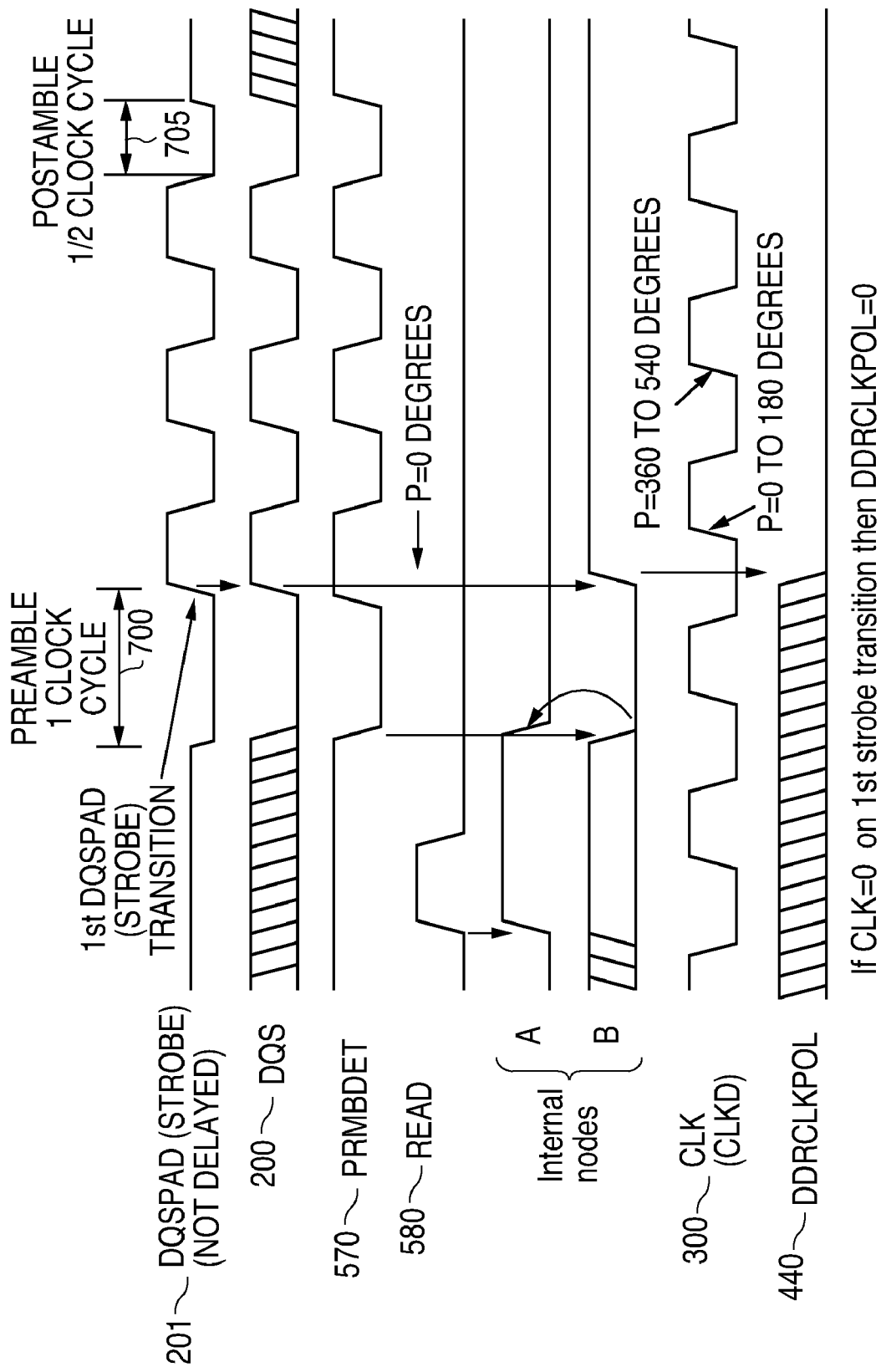
FIG. 7 is a timing diagram for signals in the clock edge selection logic of FIG. 5.

Case 1 operation may be better understood with respect to the waveform diagram of FIG. 7. Programmable logic device 100 asserts a READ command 580 at the start of a read cycle that is received an input to NOR gate 510. Thus, the output of NOR gate 510 goes low upon the assertion of the READ command. This low output couples as an input to NOR gate 515. NOR gate 515 also receives the output of NOR gate 525 that is low at this time as well because NOR gate 525 also receives READ command 580 as an input. Thus, the output of NOR gate 515 at node A goes high upon the assertion of READ command 580. NOR gate 505 receives preamble detect signal PRMBDET 570 as an input. Because PRMBDET 570 will be high prior to the onset of preamble 700, the output of NOR gate 505 will be low.

NOR gate 505 also receives as an input the output of NOR gate 510. Because the output of NOR gate 510 is already low, the output of NOR gate 505 will go high when PRMBDET 570 is pulled low at the onset of preamble 700. NOR gate 520 receives as inputs the output of NOR gate 505 and NOR gate 525. Because both these inputs are low, the output of NOR gate 520 at node B will be high prior to the onset of preamble 700. However, the high output of NOR gate 505 in response to the onset of preamble 700 (pulling DQS 200 low) causes NOR gate 520 to pull node B low. Because READ 580 and node B are both low, the inputs to NOR gate 525 will all be low when DQS 200 is pulled low at the onset of preamble 700. Thus, the output of NOR gate 525 will go high at the onset of the preamble. Because register 530 is clocked by an inverted version of the output of NOR gate 525, register 530 will not register the value of CLK 300 at this time. Instead, internal clock CLK 300 will be registered when the output of NOR gate 525 goes low at the first rising edge of DQS 200 at the end of preamble 700. The value of CLK 300 at the first rising edge of DQS 200 after the preamble will thus be registered in register 530 and appear as its Q output 531. Because case 1 operation is illustrated in FIG. 7, Q 531 will be low at this registration and presented as clock polarity control signal 440. Referring back to FIG. 4, this low state for clock polarity control signal 440 controls mux 450 to select for its non-inverting input 452 such that registers 460 and 465 are clocked with a non-inverted version of internal clock CLK 300 as signal 453.

DDR SDRAM data bursts will always end with a falling edge of DQS 200 as seen in FIG. 7 and followed by a "postamble" 705 that is one half clock cycle in which DQS 200 remains low. After postamble 705, DQS 200 is tri-stated. The tri-stating of DQS 200, however, can introduce glitches such that registers 425 and 430 are improperly clocked after postamble 705, thereby corrupting the contents of these registers. The problem arises because two falling edges of DQS 200 occur (due to the glitch) prior to a rising edge of output signal 453 from clock polarity mux 450. Clock edge selection circuitry prevents this potential problem as follows. DQS signal 200 is delayed through slave delay circuit 210 to provide phase-shifted DQS signal 565 that clocks register 550. Register 550 is configured to register a logic high whenever it clocked by DQS signal 565. Thus, when DQS signal 565 transitions high, a Q output 551 of register 550 also goes high.

Both phase-shifted DQS signal 565 and Q output 551 are received as inputs to OR gate 560 that in turn outputs phase-shifted. DQS signal 205. As long as Q output 551 is high, DQS signal 205 cannot go low, Q output 551 can only go low when reset by an output 541 of clock polarity selection mux 540. Because clock polarity selection mux 540 is controlled in the same fashion as is clock polarity mux 450, output 541 goes low synchronously with output 453. Thus, phase-shifted DQS signal 205 is prevented from responding to glitches after postamble 705.

Figure 8:
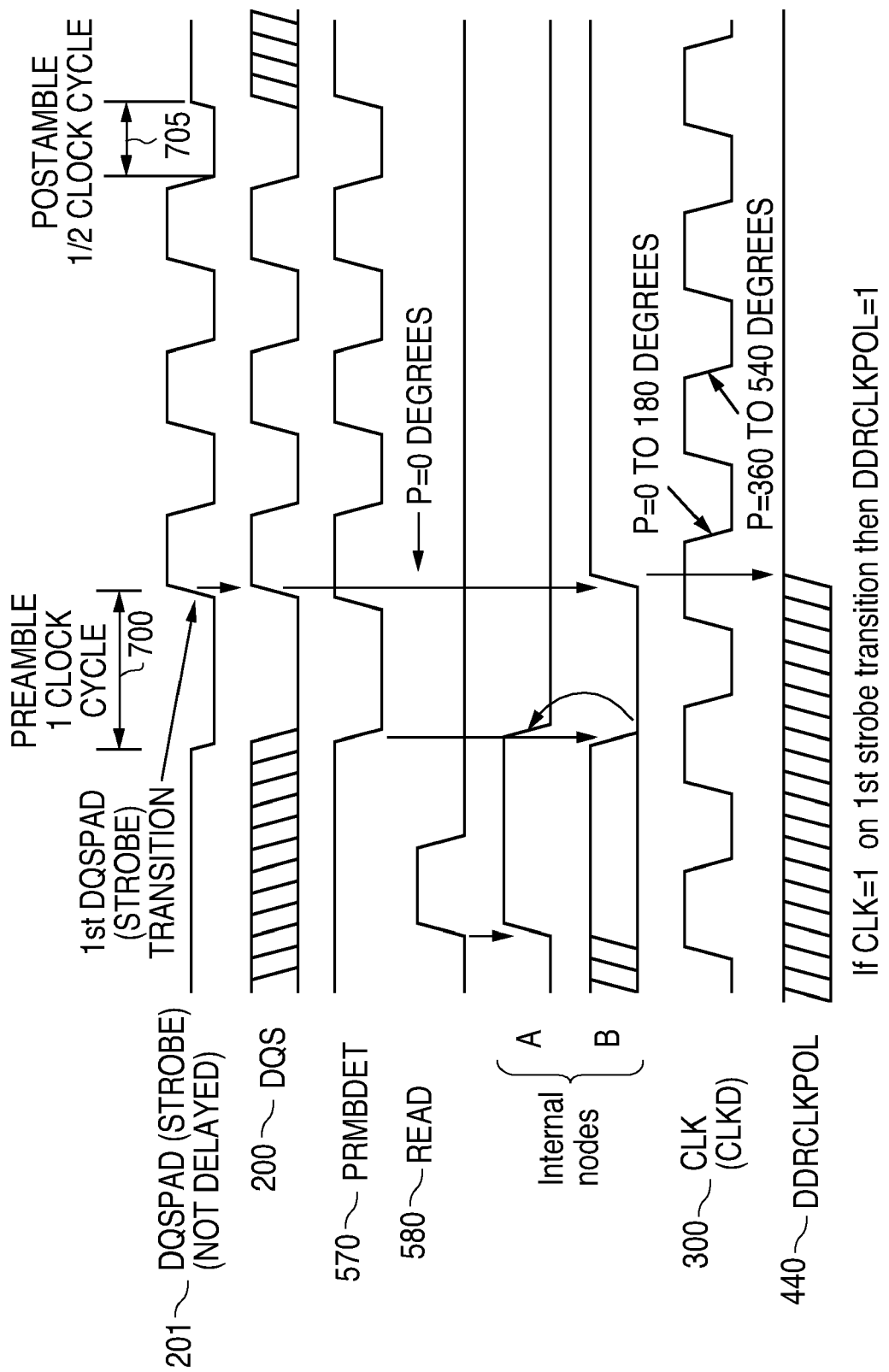
FIG. 8 is a timing diagram for signals in the clock edge selection logic of FIG. 5.

Case 2 operation may be better understood with reference to FIG. 8. The signal states are the same as described with respect to FIG. 7 until the first DQS 200 transition after expiration of the preamble. In contrast to FIG. 7, CLK 300 is in a logic low state at this transition. Thus, register 530 captures a logic low such that clock polarity control signal 440 is also low. Referring back to FIG. 4, this low state for clock polarity control signal 440 controls mux 450 to select for its inverting input 451 such that registers 460 and 465 are clocked with an inverted version of CLK 300 as output 453. It will be appreciated that regardless of whether case 1 or case 2 operation is enabled, clock edge selection logic 500 operates to select for the proper clock edge such that hold times are maximized at registers 460 and 465, thereby enabling high speed data transfer rates such as, for example, 200 MHz.

The above-described embodiments of the present invention are merely meant to be illustrative and not limiting. It will thus be obvious to those skilled in the art that various changes and modifications may be made without departing from this invention in its broader aspects. Accordingly, the appended claims encompass all such changes and modifications as fall within the true spirit and scope of this invention.

We claim:

1. Within a programmable logic device (PLD) having an internal clock, a multi-date rate SDRAM interface for multi-date rate SDRAM, the multi-date rate SDRAM providing data to the PLD on the rising and falling edges of a DQS signal, the interface comprising:
    a DQS clock tree;
    a slave delay circuit adapted to shift the phase of the DQS signal relative to the phase of data to provide a phase-shifted DQS signal to the DQS clock tree, the slave delay circuit responsive to a control signal in providing the amount of phase shift; and
    a master delay circuit adapted to generate the control signal for the slave delay circuit, the master delay circuit further adapted to compare the internal clock with a delayed version of the internal clock in setting the value of the control signal, the master delay circuit including a delay line comprising a plurality of instantiations of the slave delay circuit and a plurality of facsimiles of the DQS clock tree.

2. The multi-date rate SDRAM interface of claim 1, wherein the master delay circuit comprises a delay-locked loop (DLL).

3. The multi-date rate SDRAM interface of claim 1, wherein the delay line includes at least four instantiations of the slave delay circuit and at least four facsimiles of the DQS clock tree.

4. The multi-date rate SDRAM interface of claim 1, wherein within the delay line a facsimile of the DQS clock tree follows each instantiation of the slave delay circuit.

5. The multi-date rate SDRAM interface of claim 1, wherein the interface is a double date rate (DDR) interface.

6. Within a programmable logic device (PLD) having an internal clock, a multi-date rate SDRAM interface for multi-date rate SDRAM, the multi-date rate SDRAM providing data to the PLD on the rising and falling edges of a DQS signal, the interface comprising:
    a DQS clock tree;
    a slave delay circuit adapted to shift the phase of the DQS signal relative to the phase of data to provide a phase-shifted DQS signal to the DQS clock tree; and
    a delay-locked loop (DLL) adapted to control the slave delay circuit, the DLL including a delay line comprising a plurality of instantiations of the slave delay circuit and a plurality of facsimiles of the DQS clock tree.

7. The multi-date rate SDRAM interface of claim 6, wherein the delay line includes at least four instantiations of the slave delay circuit and at least four facsimiles of the DQS clock tree.

8. The multi-date rate SDRAM interface of claim 6, wherein within the delay line a facsimile of the DQS clock tree follows each instantiation of the slave delay circuit.

9. The multi-date rate SDRAM interface of claim 6, wherein the DLL is further adapted to compare the internal clock with a delayed version of the internal clock in setting the value of a control signal for the slave delay element, the DLL further including a latch for latching the value of the control signal before the signal's application to the slave delay element.

10. The multi-date rate SDRAM interface of claim 6, wherein the DLL is further adapted to compare the internal clock with a delayed version of the internal clock in setting the value of a control signal for the slave delay element, the DLL further including a variable delay circuit for adjusting the value of the control signal before the signal's application to the slave delay element.

11. The multi-date rate SDRAM interface of claim 6, wherein the interface is a double date rate (DDR) interface.

12. Within a programmable logic device (PLD) having an internal clock, a multi-date rate SDRAM interface for multi-date rate SDRAM, the multi-date rate SDRAM providing data to the PLD on the rising and falling edges of a DQS signal, the interface comprising:
    a DQS clock tree;
    a slave delay circuit adapted to shift the phase of the DQS signal relative to the phase of data to provide a phase-shifted DQS signal to the DQS clock tree, the slave delay circuit responsive to a control signal in providing the amount of phase shift; and
    a delay-locked loop (DLL) adapted to generate the control signal for the slave delay circuit, the DLL further adapted to compare the internal clock with a delayed version of the internal clock in setting the value of the control signal, the DLL including:
        a delay line adapted to provide the delayed version of the internal clock, the delay line comprising at least four instantiations of the slave delay circuit, each instantiation followed by a facsimile of the DQS clock tree;
        a latch for latching the value of the control signal; and
        a variable delay circuit for adjusting the value of the latched control signal before the signal's application to the slave delay element.

13. The multi-date rate SDRAM interface of claim 12, wherein the interface is a double date rate (DDR) interface.

* * * * *